(12) United States Patent
Cockrell et al.

(10) Patent No.: US 6,182,084 B1
(45) Date of Patent: Jan. 30, 2001

(54) METHOD AND APPARATUS OF DATA COMPARISON FOR STATISTICAL INFORMATION CONTENT CREATION

(75) Inventors: Eric Cockrell, Broken Arrow; Jamie Buckley; James Davis, both of Tulsa, all of OK (US)

(73) Assignee: Williams Communications, Inc., Tulsa, OK (US)

( * ) Notice: Under 35 U.S.C. 154(b), the term of this patent shall be extended for 0 days.

(21) Appl. No.: 09/084,760

(22) Filed: May 26, 1998

(51) Int. Cl.[7] ........................................ G06F 17/30
(52) U.S. Cl. ................. 707/104; 707/1; 707/3; 707/10
(58) Field of Search .................... 707/1, 3, 6, 200, 707/201, 500, 517, 522, 523, 524, 104, 10, 203, 100

(56) References Cited

U.S. PATENT DOCUMENTS

| Re. 33,559 | 3/1991 | Fallacaro et al. ............. 386/97 |
| 2,911,462 | 11/1959 | Brady ........................ 348/160 |
| 3,401,469 | 9/1968 | Shaver ...................... 434/307 R |
| 3,795,771 | 3/1974 | Gundersen et al. ............ 370/242 |

(List continued on next page.)

FOREIGN PATENT DOCUMENTS

| 2021458 | 1/1992 | (CA) . |
| 1493709 | 11/1977 | (GB) . |
| 2161629A | 1/1986 | (GB) . |
| 2304214 | 12/1997 | (GB) ................. G06F/11/14 |
| WO 99/04379 | 1/1999 | (WO) ................. G08G/1/09 |

OTHER PUBLICATIONS

Barstow, D.R. et al.: "Personalized Interactive Real–Time Sports Reporting Using Java", American Programmer, Jan. 1997, Cutter Inf. Corp. USA, vol. 10, No. 1, pp. 32–37, XP002111614, ISSN: 1048–5600, pp. 34–36.

*Primary Examiner*—Jack M. Choules
*Assistant Examiner*—Greta L. Robinson
(74) *Attorney, Agent, or Firm*—Head, Johnson & Kachigian

(57) ABSTRACT

A method and apparatus of data comparison for statistical information content creation which will process and store raw data, compare the processed raw data with historical data and retrieve processed new content aggregated data with the raw data including a plurality of elements on real time statistical information about a sporting event. The invention includes a common computer network and a plurality of client devices connected to the common network. A server system connected to the common network includes a data storage device storing a plurality of databases including a first database and a second database, a memory device storing code for the system, a plurality of client devices coupled to the computer processor and a processor coupled to the data storage device and the memory device, the processor executing code for the system such that the system is operable to (a) receive raw data and convert the raw data into first formatted data (FFD); (b) route the FFD to the first database; (c) compare the FFD with historical data (HD) according to a set of predetermined rules and protocols in order to determine if a condition has been satisfied with the HD located in the second database; and (d) notify the plurality of client devices if the condition has been met and provide the new content aggregated data.

10 Claims, 3 Drawing Sheets

U.S. PATENT DOCUMENTS

| | | | |
|---|---|---|---|
| 4,496,148 | 1/1985 | Mortstain et al. | 463/9 |
| 4,553,222 | 11/1985 | Kurland et al. | 705/15 |
| 4,584,603 | 4/1986 | Harrison | 348/8 |
| 4,684,980 | 8/1987 | Rast | 348/7 |
| 4,771,344 | 9/1988 | Fallacaro et al. | 386/97 |
| 4,835,604 | 5/1989 | Kondo et al. | 348/8 |
| 4,866,515 | 9/1989 | Tagawa et al. | 348/8 |
| 4,958,381 | 9/1990 | Toyoshima | 463/32 |
| 4,977,503 | 12/1990 | Rudnick et al. | 700/91 |
| 5,013,038 | 5/1991 | Luxenberg et al. | 455/4.2 |
| 5,027,400 | 6/1991 | Baji et al. | 348/12 |
| 5,057,915 | 10/1991 | Von Kohorn | 463/9 |
| 5,247,347 | 9/1993 | Litteral et al. | 348/7 |
| 5,253,341 | 10/1993 | Rozmanith et al. | 709/219 |
| 5,289,272 | 2/1994 | Rabowsky et al. | 348/8 |
| 5,311,302 | 5/1994 | Berry et al. | 348/14 |
| 5,326,104 | 7/1994 | Pease et al. | 463/18 |
| 5,504,312 | 4/1996 | Morrison et al. | 235/375 |
| 5,517,494 | 5/1996 | Green | 370/408 |
| 5,524,272 | 6/1996 | Podowski et al. | 455/3.2 |
| 5,526,035 | 6/1996 | Lappington et al. | 348/13 |
| 5,541,638 | 7/1996 | Story | 348/7 |
| 5,555,466 | 9/1996 | Scribner et al. | 348/8 |
| 5,561,670 | 10/1996 | Hoffert et al. | 370/410 |
| 5,568,484 | 10/1996 | Margis | 370/452 |
| 5,589,892 | 12/1996 | Knee et al. | 348/731 |
| 5,592,657 | 1/1997 | Johnson et al. | 703/21 |
| 5,608,447 | 3/1997 | Farry et al. | 348/7 |
| 5,610,822 | 3/1997 | Murphy | 701/211 |
| 5,612,730 | 3/1997 | Lewis | 348/8 |
| 5,612,959 | 3/1997 | Takase | 370/390 |
| 5,617,539 | 4/1997 | Ludwig et al. | 709/205 |
| 5,629,732 | 5/1997 | Moskowitz et al. | 348/7 |
| 5,642,155 | 6/1997 | Cheng | 348/12 |
| 5,666,291 | 9/1997 | Scott et al. | 709/250 |
| 5,689,637 | 11/1997 | Johnson et al. | 714/46 |
| 5,696,763 | 12/1997 | Gang, Jr. | 370/390 |
| 5,701,451 | 12/1997 | Rogers et al. | 707/1 |
| 5,714,997 | 2/1998 | Anderson | 348/39 |
| 5,727,002 | 3/1998 | Miller | 714/748 |
| 5,745,126 | 4/1998 | Jain et al. | 382/154 |
| 5,745,159 | 4/1998 | Wax et al. | 348/8 |
| 5,745,880 | 4/1998 | Strothmann | 705/7 |
| 5,754,938 * | 5/1998 | Herz et al. | 455/4.2 |
| 5,778,187 | 7/1998 | Monteiro et al. | 709/231 |
| 5,797,126 | 8/1998 | Helbling et al. | 705/5 |
| 5,812,937 * | 9/1998 | Takahisa et al. | 455/66 |
| 5,848,396 * | 12/1998 | Gerace | 705/10 |
| 5,893,091 | 4/1999 | Hunt et al. | 707/373 |
| 5,898,587 | 4/1999 | Bell et al. | 700/92 |
| 5,920,873 * | 7/1999 | Van Huben et al. | 707/202 |
| 5,928,331 | 7/1999 | Bushmitch | 709/231 |
| 5,940,391 | 8/1999 | Malkin et al. | 370/390 |
| 5,968,126 | 10/1999 | Ekstrom et al. | 709/225 |
| 5,978,381 | 11/1999 | Perlman et al. | 370/432 |
| 5,983,005 | 11/1999 | Monteiro et al. | 709/231 |
| 5,991,751 * | 11/1999 | Rivette et al. | 707/1 |
| 6,004,276 * | 12/1999 | Wright et al. | 600/508 |

* cited by examiner

METHOD AND APPARATUS OF DATA COMPARISON FOR STATISTICAL INFORMATION CONTENT CREATION

BACKGROUND OF THE INVENTION

1. Field of the Invention

The present invention relates generally to the comparison of real time data with historical data. More specifically, the present invention relates to a comparison of real time sports statistical data with historical sports statistical data over a client/server computer network.

2. Prior Art

One product of a sporting event is the generation of statistics. The statistical data generated is used for many different things such as post game evaluation, historical documentation, comparison between individual players and teams and individual accomplishment. This statistical information is so critical that individual teams, television broadcast companies and the like spend a great deal of resources in the collection and tracking of the statistical data derived from sporting event.

In addition, sports fans also have a great interest in following the statistical data of their desired sports team or athlete. In most cases, the sports fan reviews the game's statistics after the event has been completed and then only the statistics which a newspaper or publication desires to release. Further, if a sports fan views an event live either at the sporting venue or through television broadcast, the statistical data is limited to that information which is displayed by the television broadcast company or the operator at the venue site and the timing and the display of the data is likewise left to the discretion of the same.

There is a need for an on-demand data comparison system primarily at the sporting of venue site. Further there is a need for each individual sport fan to be able to view the statistical data of his or her choice. Therefore, it is desirable to design a system capable of allowing individual sport fans to request and view specific information.

SUMMARY OF THE INVENTION

In accordance with the present invention, a client/server computer network capable of transferring data, such as statistical data, between the server and the plurality of clients contained within the network is disclosed. The server having a data storage means such as a harddrive or a removable harddrive, to store historical data, raw data and processed raw data, memory means to store code to operate the system and applications to process data and processing means in which to process the data and the code for the system is bi-directionally connected to a plurality of clients connected by a common network. Each client includes a memory means to store code to operate the client, display means to display information, input means such as a mouse, keyboard, touchscreens or a wireless system and processing means to process the code to operate the client and to process input received from the server and/or the user.

The operation of the present invention involves the following initial steps: populate a historical database which is contained within the data storage device with historical statistical data, receive real time raw data from an outside source, and process said raw data by the server. The processed raw data is then stored in the data storage device means. The processed raw data is then compared with historical data to determine if a condition has been met. If a condition has been met, means such as a software application broadcasts this event to the common network. The plurality of clients which is connected to the common network listens to the broadcast and displays the broadcast information.

The client may request specific information from the server. The request is processed by a processing means such as a computer processor and software applications with the results of the request being transferred from the server to the client via the common network.

Other aspects and advantages of the present invention can be seen upon review of the figures, detailed description and the claims which follow.

DETAILED DESCRIPTION OF THE PREFERRED EMBODIMENTS

Figure 1:
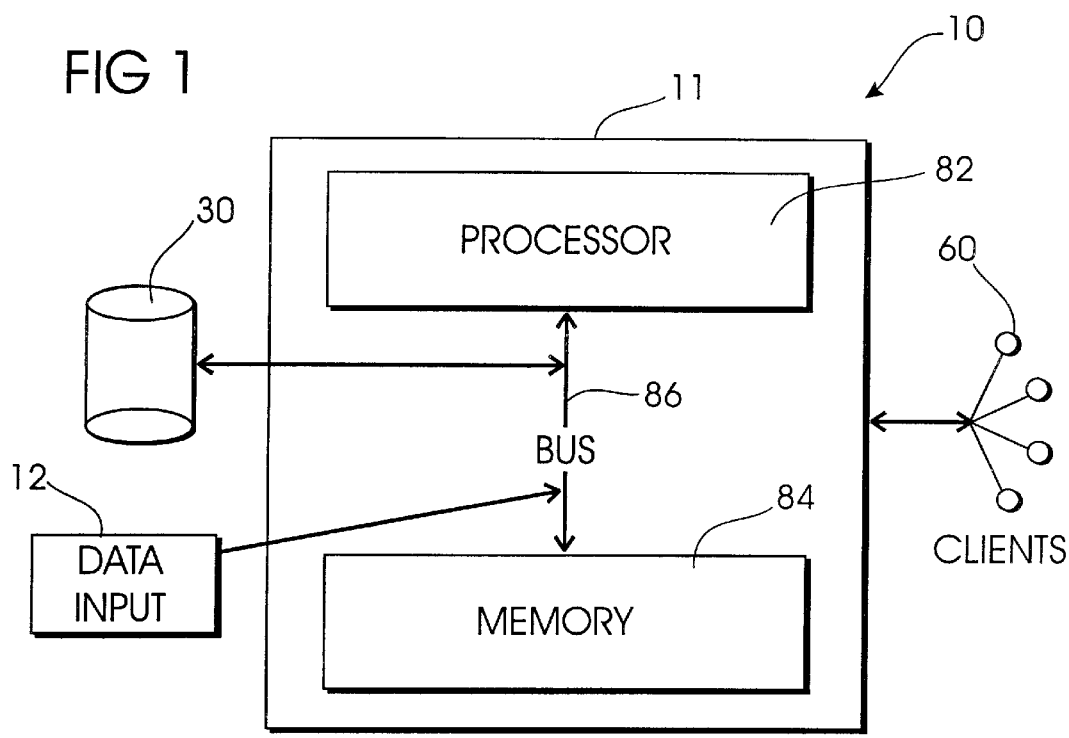
FIG. 1 shows schematically an overview of the preferred embodiment.

Referring to the drawings in detail, FIG. 1 is a block diagram illustrating a data comparison system 10 constructed in accordance with the present invention. The data comparison system 10 is contained within a client/server computer network, having a server 11 and a plurality of clients 60. The server 11 has a computer processor 82 and memory 84 connected by a bus 86. Memory 84 is a relatively high speed machine readable medium and includes memory such as random access memory (RAM) and non-volatile memory such as read only memory (ROM). Also connected to the bus 86 are a data storage device 30 and a data input means 12. Data storage device 30 includes machine readable media such as floppy disk drives, removable hard drives, magnetic tape, CD-ROM and even other computers. Computer program software such as DATA COLLECTOR 16, STAT WATCHER 40, SERVICE COLLECTOR 50, and VISK 70 and user programs can be stored in a software storage medium such as memory 84.

Figure 2:
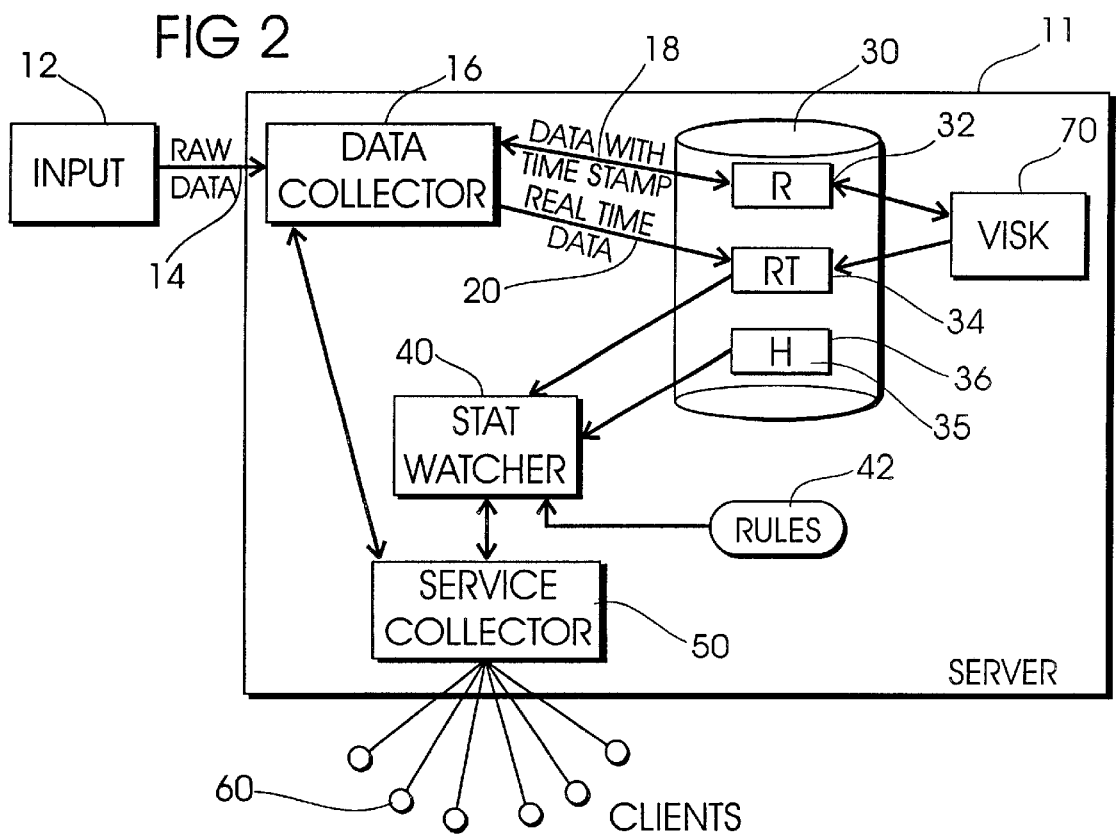
FIG. 2 illustrates schematically data from its input into the present invention through to its display.

As can be seen from FIGS. 1 and 2, the preferred embodiment provides a client-server network having a data comparison system 10. More specifically, a plurality of clients 60 being bi-directionally coupled by a common network over a line or via a wireless system to the preferred computer system which we call our server. Each client is able to process selected data and display the processed data to the end user. The server can be a standard type server or similar type device which performs server functions.

Turning to FIG. 2 which shows a schematic of the preferred embodiment having an input means 12, a data collection storage referred to as DATA COLLECTOR 16 and comparative means referred to as STAT WATCHER 40 and an output display means referred to as SERVICE COLLECTOR 50. Input means 12 can include data from a third party data provider or from data contained in a database. The data can be in the form of ASCII text and represent statistical data of an event such as a sporting event. Further, the data can represent real time statistics or historical statistics. The data is received by a DATA COLLECTOR 16 where it is converted and processed and then transferred to a data storage device 30. The data is transferred in two different formats. The first format being a time stamped data 18 which is stored in a raw data database 32 contained in the data storage device. The second format being a real-time data format 20 which is stored in a real-time database 34.

A data comparison software application called STAT WATCHER 40 compares the real-time data data 20 with historical data 35 which is contained in the historical database 36. STAT WATCHER 40 utilizes a set of predetermined rules and protocols 42 when making its comparison. STAT WATCHER makes a comparison between the two sets of data in an attempt to determine whether an event has occurred. If such an event has occurred it notifies a control application called SERVICE COLLECTOR 50 of such an event. SERVICE COLLECTOR 50 then broadcasts the event over the common network. Each client 60 which is coupled to the common networkreceives such broadcasts where it processes the information and displays the event.

Figure 3:
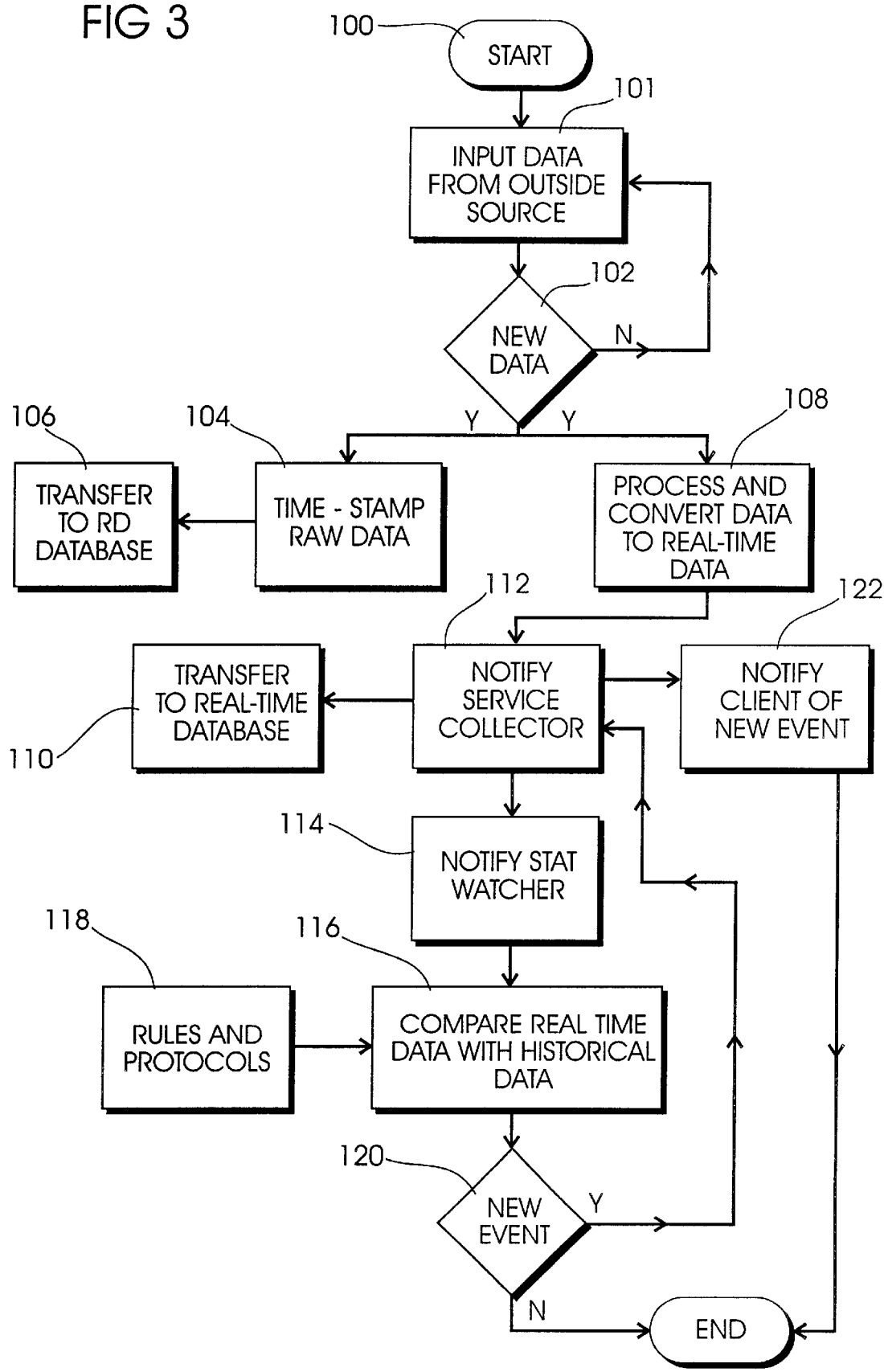
FIG. 3 illustrates a flow chart showing data flow from its input into the present invention through to its display.
Figure 4:
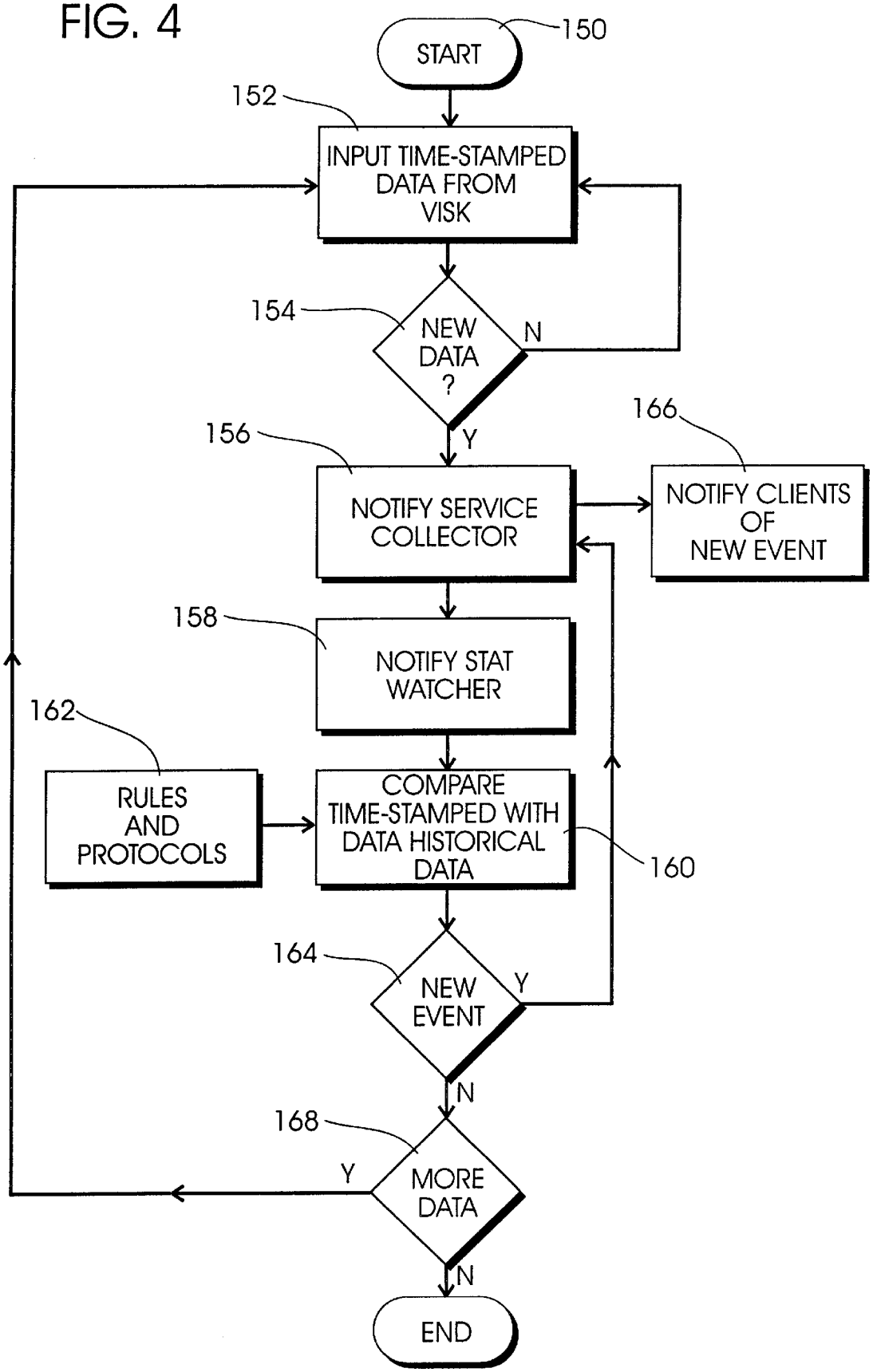
FIG. 4 illustrates a flow chart showing historical data flow from its input into the present invention through to its display.

FIGS. 3 and 4 show a schematic illustration of the method of the preferred embodiment having steps as follows. The method for data comparison starts at 100. At box 101 data in a machine readable form, such as ASCII text, is input into the system. A loop is executed to return to the start command until new data has been received. Once new data has been received, the raw data is converted and processed into time-stamped data 18 as seen at 104 and transferred to a real data database as seen at box 106.

Simultaneously at box 108 the raw data is converted and processed into real time data. The real-time data 20 is transferred to a real-time database as seen at box 110. Simultaneously notification is sent to the SERVICE COLLECTOR 50 that new data is being transferred as shown at box 112. SERVICE COLLECTOR 50 then notifies STAT WATCHER 40 that new data has been transferred as shown at box 114. STAT WATCHER 40 utilizing rules and protocols 42 at box 118, compares the real-time data 20 with historical data 35 as seen in box 116 and queries whether a new event has occurred. If a new event has occurred as at box 120, SERVICE COLLECTOR 50 is notified of such a new event and notifies the plurality of clients 60 of such a new event as shown at box 122. After such notification or if no new event has occurred the steps in the method of the present embodiment repeat themselves until no new data is available.

FIG. 4 illustrates the sequential treatment of the historical data. The method for historical data comparison starts at 150 wherein data in a machine readable form, such as ASCII text, is input into the system 11. A loop is executed to return to the start command until new data has been received. New data is received from a historical data base which will be referred as VISK as shown at step 152.

Notification is then sent to the SERVICE COLLECTOR 50 that new data is being transferred as shown at box 156. SERVICE COLLECTOR 50 then notifies STAT WATCHER 40 that new data has been transferred as shown at box 158. STAT WATCHER 40, utilizing rules and protocols 42, compares the time-stamped data 20 with historical data 35 as shown at step 160 and queries whether a new event has occurred. If a new event has occurred as at 164, SERVICE COLLECTOR 50 is notified of such a new event and notifies the plurality of clients 60 of such a new event at box 156. After such notification or if no new event has occurred the steps in the method of the present embodiment repeat themselves until no new data is available.

One example of the invention the present embodiment can be used as part of an interactive information system offering multimedia sports content. The information system can comprise a client/server network having a server bi-directionally coupled to a plurality of clients by a common network and deployed within a stadium or arena during a live sporting event. Each client would be connected to a given stadium seat. Server would be located at a remote location. The system would provide video, statistical data and other game enhancements to the sports fan.

The server would be able to have the ability to monitor real-time game statistics. These statistics would be provided by the official game statistics provider. The present invention would be utilized to determine if any event has been reached, such as a new record has been created. If such an event occured, the present invention has the capabililty to notify each client of the event.

Whereas, the present invention has been described in relation to the drawings attached hereto, it should be understood that other and further modifications, apart from those shown or suggested herein, may be made within the spirit and scope of this invention.

What is claimed is:

1. A data storage, retrieval and comparison system for processing and storing raw data, comparing said processed raw data with historical data and retrieving processed new content aggregated data, the raw data including a plurality of elements on real time statistical information about a sporting event, the system comprising:
    (a) a common computer network;
    (b) a plurality of client devices connected to the common network; and
    (c) a server system connected to the common network having:
        1) a data storage device storing a plurality of databases including a first database and a second database;
        2) a memory device storing code for the system;
        3) a plurality of client devices coupled to said computer processor;
        4) a processor coupled to the data storage device and the memory device, the processor executing code for the system such that the system is operable to:
            a) receive raw data and convert said raw data into first formatted data (FFD);
            b) route said FFD to the first database;
            c) compare said FFD with historical data (HD) according to a set of predetermined rules and protocols in order to determine if a condition has been satisfied, with said HD located in the second database; and
            d) notify the plurality of client devices if said condition has been met and provide said new content aggregated data.

2. The system of claim 1 wherein each client device comprises:
    a local central processing unit;
    a display unit;
    a set of computer instructions to receive and display FFD and HD; and
    a set of computer instructions to request specific aspects of FFD and HD.

3. The system of claim 1 wherein the code to operate the system further comprises code capable of:
    notifying said code to compare the FFD with the HD that converted raw data is being routed to the first database.

4. The system of claim 1 wherein the raw data further comprises:
    real-time statistical information about a sporting event.

5. The system of claim 1 wherein said data storage device further stores a third database and the code to operate the system further comprises code such that the system is operable to:
  a. convert said raw data into second formatted data (SFD); and
  b. route said SFD to the third database.

6. The system of claim 1 wherein the raw data is the SFD and received from the second database.

7. A method of data comparison for processing raw data and comparing said processed raw data with historical data in order to create new content aggregated data by utilizing a data storage device storing a first database and a second database, a memory device storing code and a computer processor coupled to the data storage device and the memory device, the data comparison method comprising the steps of:
  (a) receiving said raw data;
  (b) converting said raw data into first formatted data (FFD);
  (c) routing the FFD to the first database; and
  (d) comparing the FFD with historical data (HD) located in the second database according to a set of predetermined rules and protocols to determine if a specific condition has been met;
  (e) notifying the processor of the specific condition if the specific condition has been met and providing said new content aggregated data to clients; and
  (f) providing control signals to the computer processor to repeat steps (a)–(e) while more raw data exists for comparison.

8. The method of claim 7 further comprising the steps of:
  (a) after step (f) is complete, the FFD becomes part of the second database or recorded in formatting of new data.

9. The method of claim 7 wherein the data storage device stores a third database, said method further comprising the steps of:
  (a) converting said raw data into second formatted data (SFD); and
  (b) routing the SFD to the third database.

10. The method of claim 9 wherein the raw data is the SFD and received from the second database.

* * * * *